(12) United States Patent
Ellman

(10) Patent No.: US 7,596,602 B2
(45) Date of Patent: Sep. 29, 2009

(54) SYSTEM AND METHOD OF FACILITATING THE DISSEMINATION OF INFORMATION BY MEANS OF ACTIVE ADVERTISEMENTS IN PORTABLE INFORMATION TRANSCEIVERS

(76) Inventor: Louis Ellman, 221-23 64$^{th}$ Ave., Bayside, NY (US) 11364

( * ) Notice: Subject to any disclaimer, the term of this patent is extended or adjusted under 35 U.S.C. 154(b) by 775 days.

(21) Appl. No.: 10/649,165

(22) Filed: Aug. 27, 2003

(65) Prior Publication Data

US 2004/0110517 A1 Jun. 10, 2004

(51) Int. Cl.
 G06F 15/16 (2006.01)
 H04B 7/00 (2006.01)
(52) U.S. Cl. ................. 709/206; 709/204; 455/41.2
(58) Field of Classification Search ............ 709/204, 709/206; 455/41.2
 See application file for complete search history.

(56) References Cited

U.S. PATENT DOCUMENTS

| | | | | |
|---|---|---|---|---|
| 5,794,210 | A * | 8/1998 | Goldhaber et al. | 705/14 |
| 5,946,646 | A * | 8/1999 | Schena et al. | 702/177 |
| 6,199,077 | B1 * | 3/2001 | Inala et al. | 715/501.1 |
| 6,252,522 | B1 * | 6/2001 | Hampton et al. | 340/905 |
| 6,282,713 | B1 * | 8/2001 | Kitsukawa et al. | 725/36 |
| 6,385,591 | B1 * | 5/2002 | Mankoff | 705/14 |
| 6,507,279 | B2 | 1/2003 | Loof | 340/572.1 |
| 6,668,278 | B1 * | 12/2003 | Yen et al. | 709/218 |
| 6,690,391 | B1 * | 2/2004 | Proehl et al. | 715/720 |
| 6,891,567 | B2 * | 5/2005 | Steinberg | 348/211.99 |
| 6,892,066 | B2 * | 5/2005 | Detweiler et al. | 455/414.4 |
| 7,181,415 | B2 * | 2/2007 | Blaser et al. | 705/14 |
| 7,292,559 | B2 * | 11/2007 | Yoshino et al. | 370/338 |
| 7,444,659 | B2 * | 10/2008 | Lemmons | 725/34 |
| 2001/0051900 | A1 * | 12/2001 | Fisher et al. | 705/26 |
| 2002/0022961 | A1 * | 2/2002 | Sepanaho | 705/1 |
| 2002/0041329 | A1 * | 4/2002 | Steinberg | 348/207 |

(Continued)

FOREIGN PATENT DOCUMENTS

JP 11-065494 * 5/1999

OTHER PUBLICATIONS

Merriam Webster. <retrieved from internet: http://www.merriam-webster.com/substantially> Feb. 11, 2008.*

(Continued)

Primary Examiner—Aaron Strange
(74) Attorney, Agent, or Firm—Lackenbach Siegel, LLP; Andrew F. Young

(57) ABSTRACT

A system and method to provide a user with a requisite receiving device (e.g., PDA, cell telephone) with the ability to record contact information, no matter how lengthy, from an interactive advertisement for storage and later use, or, at the user's option, to obtain the information at his or her convenience even at the location of the advertisement. The invention can work accurately in any environment, including those regions where there might be heavy traffic or congestion, and a plurality of interaction signs or posters can readily interface with the recipient's device. However, an important feature of the present invention is that the user can choose to only accept that contact information that is of interest to him or her, and does not have to automatically record and/or interact with any transmitter just because it is in the sphere of influence of the receiving device.

27 Claims, 8 Drawing Sheets

U.S. PATENT DOCUMENTS

| | | | | |
|---|---|---|---|---|
| 2002/0047868 A1* | 4/2002 | Miyazawa | ................... | 345/835 |
| 2002/0077896 A1* | 6/2002 | Liu et al. | ...................... | 705/14 |
| 2002/0094787 A1* | 7/2002 | Avnet et al. | ................... | 455/68 |
| 2003/0120745 A1 | 6/2003 | Katagishi et al. | ............ | 709/217 |
| 2004/0038645 A1* | 2/2004 | Rcunamaki et al. | ......... | 455/41.2 |
| 2004/0078427 A1* | 4/2004 | Gil et al. | ..................... | 709/203 |
| 2004/0088235 A1* | 5/2004 | Ziekle et al. | .................. | 705/34 |
| 2004/0110517 A1* | 6/2004 | Ellman | ....................... | 455/466 |

OTHER PUBLICATIONS

Merriam Webster. <retrieved from internet: http://www.merriam-webster.com/constantly> Feb. 11, 2008.*

Cellular Phone with Auto Dialing. IBM Technical Disclosure Bulletin, Aug. 1993, US. vol. 36, Issue. 8 pp. 321-322.*

* cited by examiner

SYSTEM AND METHOD OF FACILITATING THE DISSEMINATION OF INFORMATION BY MEANS OF ACTIVE ADVERTISEMENTS IN PORTABLE INFORMATION TRANSCEIVERS

BACKGROUND OF THE INVENTION

1. Field of the Invention

The present invention generally relates to interactive advertisements and, more specifically, to a system and method of facilitating the dissemination of information by means of active advertisements and portable information transceivers.

2. Description of the Prior Art

A primary objective of advertising is to disseminate information or praise a product or service to potential consumers so as to get them to purchase it. The more efficient the advertising, the more widely the information is disseminated, and the more cost effective the advertising, as costs decrease to reach a given population of prospective purchasers. However, not all advertising is cost effective, and advertisers frequently spend substantial sums of money without deriving much benefit from it. In some cases, the advertising does not reach the significant portion of the population. In other cases, the advertising is directed at a portion of the population that may not be interested in purchasing the product or service, so that the advertising is not properly targeted. In still other instances, while the proper segment of the population may be targeted, the advertising is not effective because it does not convey the proper or sufficient information to a potentially interested purchaser that is in a form that can be practically used to purchase or provide follow-up for the potential consumer in deciding whether to purchase the product or service.

While numerous examples will be evident, a very common example is the use of large signs or billboards. These are frequently placed along well-traveled routes in the hope that the people passing the sign or billboard will see it, and it will generate interest in the product or service. In many instances, such billboards are along highways or roads traveled by vehicle or other means of public transportation, and there is but a very limited window of opportunity that a person can actually see and read the sign or billboard. In many cases, the window of opportunity to do this is very short, and not all of the information depicted on the billboard or poster can be read. Even when it can be read totally, it must be somehow committed to memory, so that if a person develops an interest in the product or service, it is then the responsibility of the prospective purchaser to figure out how to contact the advertiser. Where a telephone number or other contact information is included, the viewer must have a pencil, paper or the like at hand to record the information for later use. In some instances, the prospective customer will see the sign or billboard while performing other functions (e.g., driving, going to work, engaging in conversation, etc.). While the product or service may be of some interest for further consideration, it is not always a top priority at the point or at the time that the advertisement in the sign or poster is first observed. However, unless suitable contact information is provided and the viewer has the means to record that information, it can be a lost opportunity for the advertiser.

Recent developments have facilitated the dissemination of appropriate information to those that see advertisements. While many advertisements provide a telephone number, and some even provide a toll-free number, telephones are frequently answered only during normal or somewhat extended business hours. Those hours may not be convenient, as the viewer may also be occupied in his or her business or engaged in some other activity during that time.

Additionally, many people have become somewhat weary of telephone contact because of the somewhat limited and sometimes inaccurate information obtained from individuals that answer the telephones. Insofar as recorded contact information, many people now have personal digital assistants (PDAs) into which users can electronically record information for later use. However, even a simple domestic telephone number that includes an area code and seven digits may be difficult to record during a short viewing window of time. This is certainly the case if the contact information provided is a Universal Resource Locator (URL). While the URLs of most "home" pages of web sites are typically relatively short, the URLs for more "embedded" or specific pages of most web sites can be exceedingly long. In the latter case, no matter what amount of time is available to view and record the information, it can be impractical and tedious to read long URLs and record them, whether on paper or in a PDA, and the probability of error increases with the length of the URL.

Because of this, most advertisers do not direct prospective customers to specific pages of their web site, but only to their home page, hoping that the user will navigate and ultimately find the information that the advertiser is seeking to convey.

A number of systems have been proposed to address the above problems. Thus, for example, in U.S. Published Application No. 2001/005,1900, published Dec. 13, 2001 (Fisher et al), an interactive display is disclosed that is intended provide a vendor or advertiser with feedback from interested customers. The system is designed to overcome the problem that advertisers often have little feedback as to how customers feel about their advertisement and what interest, if any, the advertisement is generating in the relevant population. The system utilizes an interactive display that permits members of the public that have PDAs to receive and transmit data via a transponder located on an outdoor advertising sign or similar location. The transponder is able to communicate with a server to upload and download data. In use, the customer reads the advertisement and, if interested, the customer points an infrared transceiver on the PDA onto the interactive display. Depending on the buttons pressed, the customer can request more information to be mailed or e-mailed, submit an order or request that the advertiser contact the customer by telephone. This is achieved, in part, by storing in the PDA various personal information, including the customer's name, address, telephone number, e-mail address, age, identification number (e.g., social security number), credit card information, etc. Such information is pre-stored within the mobile or portable device and, in the appropriate circumstances, can be uploaded to the advertiser's server by means of the sign or poster. While the form of communication, as described, is not critical, and includes infrared, microwave, ultrasonic, RF, sonar or laser signals, the sign or poster essentially serves as a large input/output ("I/O") device or interface through which the viewer can communicate with the advertiser. While this may serve the purpose of the advertiser well, it is not always practical, for the reasons stated above, or beneficial to the user. The user cannot always take the time to make a decision at the time that the user is before the advertising interface. Unless it is intended that the product or service be purchased as an impulse purchase, most often consumers need time to research and consider a purchase. Also, by uploading sensitive personal information in proximity to the interactive sign or poster, this can be an inducement to some to intercept such information at the location of the sign or poster and steal the identity information of a customer. While the portable device, therefore, is intended to interact with a transmitter on the sign or poster, it is not primarily intended to store information regarding the specific advertisement but rather to immediately interact with the advertiser. There does not appear to be any indication that it is intended that information be received and stored in the PDA for later use.

Fisher et al. describes "previously passive" signs that have been made "active," thereby allowing the user to be in the position of pressing buttons that simulate an automated menu driven phone system for any major corporation. The choices available to the user from the phone system help to speed up the process of making a request for information, as compared to picking up your standard cell phone when spotting an advertisement and listening to menu choices and selecting what you want. However, it is important to note that Fisher et al. does not disclose or even suggest the simplicity of attracting a URL into a phone display or PDA device for the sole purpose of being able to go directly into the website that was targeted in the advertisement and immediately having at one's disposal the entire catalog of what a company has to offer. Moreover, having transponders blanketing an area could become prohibitively expensive for wide spread deployment. Fisher et al basically discloses a way to "bypass the internet" by using a system that works between an active sign connected to a server and a user who has a specific device which is "in-tune" with the information emanating from the active sign. It is preferable for users to use their own equipment (i.e., a cell phone or PDA). It is also preferable to avoid having a local server or another major piece of hardware in order to get a URL into the hands of the user. Arguably, since Fisher et al., discloses that the user does not go into a website, as would be the case with the system of the present invention, the user is limited to either buying the item being displayed on the advertisement or receiving information about that item, instead of having full access to all of the goods and services offered by the company by entering the website of the vendor.

Fisher et al. also discusses a system and device for sending data (i.e., messages) to other locations within a business establishment (i.e., a diner). Yet, again Fisher et al. does not disclose or even suggest the objectives of the present invention, such as getting a user to capture a website address of a particular vendor that they (the user) consciously want to capture because of an initial interest in a sign, storefront, billboard, bus advertisement, etc.

This interactive display described above also provides the viewer with a predetermined alphanumeric code that is shown on the sign or poster, or mentioned in radio, TV or print advertising. It is not clear how such alphanumeric code is reported to the viewer. However, Fisher et al. state that an interested customer is then able to enter this code into a PDA and at some point to send the code to any like interactive display. The identifying code is then used to download relevant data to the user's PDA that can be read immediately or at a later time. This requires, therefore, that the user somehow record such code, as he or she would use a telephone, and such must then be entered into a PDA and used in proximity to another interactive sign or poster in order to download relevant information.

In U.S. Published Application No. 2002/0022961, published Feb. 21, 2002 (Sepanaho), a method is disclosed for displaying information on a portable digital device by transmission of a universal resource locator (URL) over a short-range radio frequency link. With this system and method, a short-range radio transmitter establishes a link to a portable digital device (e.g., PDA) within the transmitter's range and transmits a URL to the device. As the user device receives the transmission, software is launched that requests information from the transmitting URL via a different radio frequency link. The invention provides the person who physically approaches a specific locale with information about that specific locale or product or service that is situated at that locale. In order to achieve this, the advertising medium includes electronics for continuously scanning for compatible user devices or PDAs. As soon as a device is determined to be within a predetermine perimeter or area, a connection is established with the user device and a URL is transmitted to the user device. Similarly, the portable devices used by the public must continuously scan for transmission devices. If a device is found, it enables the device, such as a PDA, to receive a URL. It is the intention and object of the invention in Sepahano to then immediately launch the browser and load the URL so as to create an interactive relationship with the advertiser, including executing a transaction possibly involving the transfer of funds to the advertiser.

In both of the aforementioned publications, there are provided discussions of the use of radio frequency transmissions and, in particularly, the use of the Bluetooth® protocols defining a universal radio interface that enables wireless electronic devices to connect and communicate wirelessly via short-range networks.

The approaches proposed above have a number of disadvantages. Thus, as suggested, the user may frequently have a very short window of time within which to see an advertisement and consider whether there is any interest in the product or service advertised. The assumption that the user immediately wants to communicate with an advertiser and possibly execute a transaction may not be accurate. Also, while the use of this technology in proximity to a single sign or poster that has the ability to transmit this type of RF information may not present any serious problems, it will be appreciated that in a congested area, in which numerous retail establishments and other opportunities for the use of such advertisements exists, there could be many potential transmitters within a given area, given that Bluetooth® technology devices can generally transmit at ranges up to 10 meters. With the second described system, for example, the use of a PDA in such a congested area might trigger more than one transmitter and the receiving device can be exposed to numerous simultaneous transmissions that can clearly interfere with one another, not to mention that the viewer may only be interested in one of such advertisements and not the rest.

SUMMARY OF THE INVENTION

While the invention has numerous applications and may be used in a number of different circumstances, it is primarily intended to provide a user with a requisite receiving device (e.g., PDA, cell telephone) with the ability to record contact information, no matter how lengthy, from an interactive advertisement for storage and later use, or, at the user's option, to obtain the information at his or her convenience even at the location of the advertisement. The invention can work accurately in any environment, including those regions where there might be heavy traffic or congestion, and a plurality of interaction signs or posters can readily interface with the recipient's device. However, an important feature of the present invention is that the user may only accept that contact information that is of interest to him or her, and not to automatically record and/or interact with any transmitter just because it is in the sphere of influence of the receiving device.

The present invention provides a system of facilitating the dissemination of information comprising a target comprising a display that is visible to a plurality of interested users, a computer interface assembly for storing a URL for a website related to the display, a transmitter assembly adapted to transmit the URL, and an identifier that indicates to the plurality of users that the target comprises the computer interface and transmitter. The identifier preferably is in the form of a logo or symbol. A respective interested user, upon seeing the display and graphic identifier, may use a respective hand-held transceiver to receive the URL transmitted by the target. The system of the present invention may also comprise a handheld transmitter adapted to work in conjunction with the target.

BRIEF DESCRIPTION OF THE DRAWINGS

The above and other objects of the invention may be more readily seen when viewed in conjunction with the accompanying drawings, wherein.

DESCRIPTION OF THE PREFERRED EMBODIMENTS

Figure 1:
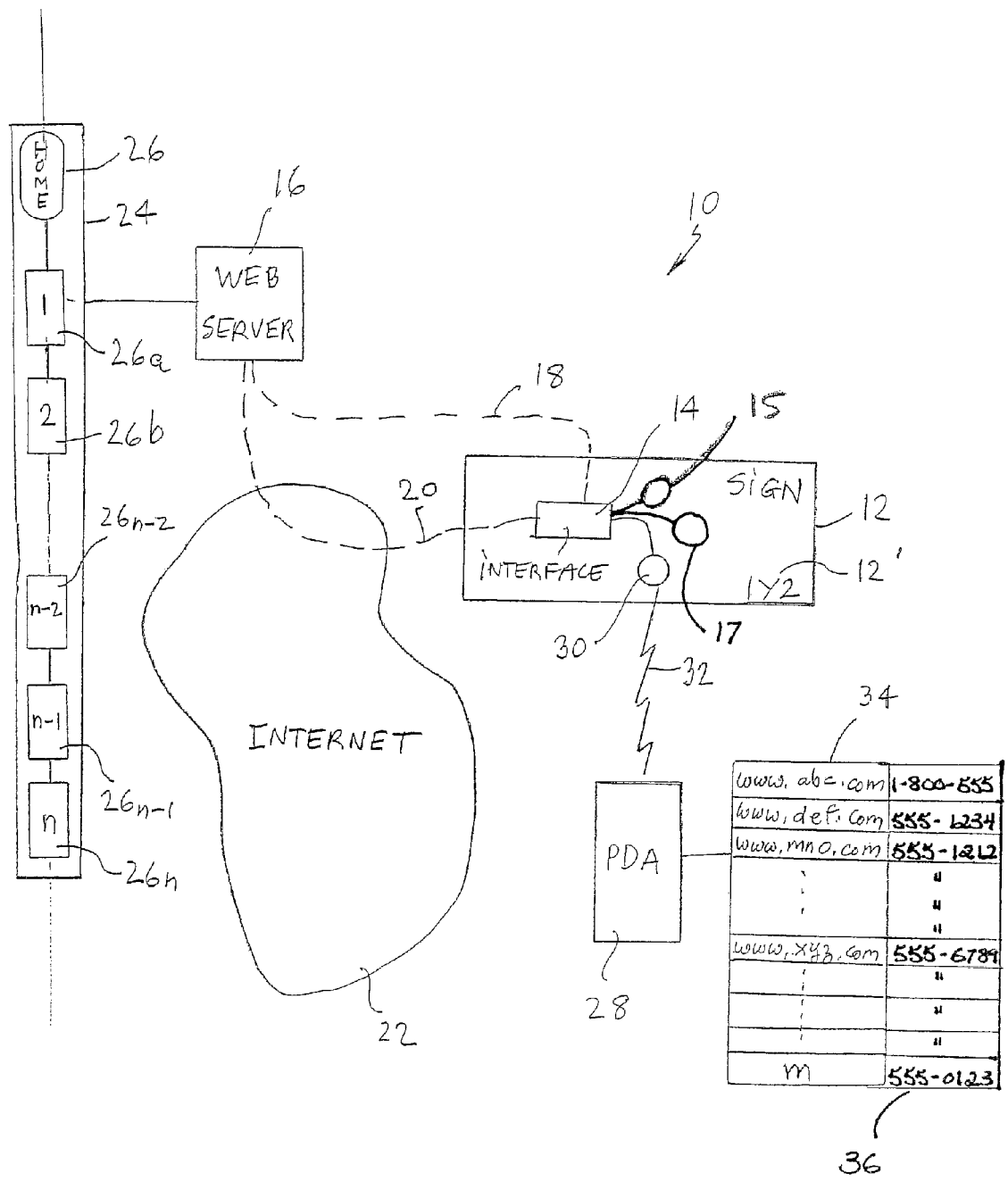
FIG. 1 is a schematic illustration of the system and method in accordance with the present invention.

Referring now specifically to the Figures, in which identical or similar parts are designated by the same reference numerals throughout, and first referring to FIG. 1, there is shown a system for facilitating the dissemination of information by means of active targets or advertisements and portable information receivers. The system is generally designated by the reference numeral 10.

The system 10 includes a target 12, which is shown in FIG. 1 as a printed sign or poster, such as an advertisement. It will be evident that any other suitable displays or targets can be used as long as they can be made interactive in accordance with the present invention, as is to be described. Other suitable displays or targets include video screens, clothing, and 3-dimensional models (e.g., window displays in department stores).

The target or sign 12 comprises a memory 15 in which information is stored and a transmitter 30 adapted to transmit the stored information. In one embodiment of the present invention, the target or sign further comprises a timer 17 for causing the advertising and/or the URL to be changed in accordance with a predetermined time sequence. Target 12 is preferably provided with an interface 14 for inputting predetermined information into the memory 15. The interface 14 may suitably comprise any input device for inputting such contact information into the memory 15. For example, interface 14 can be in the form of keyboard for inputting the data locally, or can include an antenna for receiving such information by radio link. In FIG. 1, the interface 14 is shown connected to the advertiser's web server 16, either by means of a direct cable connection 18 or by a securable connection 20 to the Internet 22. Typically, the advertiser's web server 16 contains extensive information in the form of a web site 24 consisting of a primary web page or homepage 26 and a plurality of secondary web pages (1 . . . n), designated by reference numerals ($26_a$, $26_b$, . . . , $26_{n-2}$, $26_{n-1}$, $26_n$). On some extensive web sites, dozens and even hundreds of web pages are provided, each of which is defined by a very specific universal resource locator (URL). While the URL address for the homepage 26 may be relatively short, the UIRLs for the some of the secondary web pages ($26_a$, $26_b$, . . . , $26_{n-2}$, $26_{n-1}$, $26_n$) may be extremely long and impractical to record manually. Even if such long URLs could be copied manually, it is unlikely that most potential customers would be willing or have the time to do so. Yet, in order to optimize the effectiveness of a user's advertising budget, the advertiser may wish to direct a prospective customer to a specific product or service that may be described, for example, on page $26_{n-2}$. For example, the aforementioned page $26_{n-2}$ may describe or show a product that the advertiser wishes to promote, such as a product that may be on sale, etc. If the home page 26 is provided because it may be more convenient to record, then the user must browse or navigate the web site to locate page $26_{n-2}$, a task that is not always easy, and frequently time consuming.

When the user or viewer possesses a portable data receiving device 28, shown in the form of a PDA, in proximity to the target, sign, or poster 12, the UIRL can be downloaded to the device 28 by means of a suitable transmitter 30 in the target, sign or poster 12. Transmitter 30 may be an active transmitter or a passive transmitter. If transmitter 30 is an active transmitter, the information stored in memory 15 is substantially continually or constantly being transmitted, whereby an interested user merely chooses to accept the information being transmitted. If the transmitter 30 is a passive transmitter, energy must be provided (i.e., by device 28) to transmitter 30 before transmitter 30 becomes active. Transmitter 30 may use any suitable means to transmit information, such as a radio frequency wave or infrared light. A preferable transmission means is radio frequency waves 32 allowing for "contactless" transmission of information between the target 12 and device 28 without requiring a line-of-sight therebetween.

The desired URL, may be temporarily or permanently stored by device 28 within a memory stack 34 as an individual line entry. The memory stack can consist of an m-number of memory locations, each of which can store a separate URL. At the convenience of the user, any one of the stored URLs can be accessed. Preferably, each stored URL is accompanied by a generic or generally descriptive phrase identifying the stored URL so that the user can recall which stored URL is associated with each product or services in which some interest has been generated. Some general descriptive phrases or descriptors can be transmitted with the URLs by the advertiser to the user or consumer. Alternatively, the user can input descriptions that would render it easier to recall the significance of each of the stored URLs. Most stores that have a web presence with a URL have one that is evident as to what it is. With devices like this, the less work and manipulation needed by the user the more sellable the idea. The responsibility falls on the entity to make sure that their URL is descriptive so that the user just by looking at the captured URL would automatically remember why they chose to capture that advertisement.

In FIG. 1, several of the memory locations are shown occupied with stored URLs. Any given stored URL can preferably be deleted by the user at any time, either before or after the URL has been used to access a designated web site.

Figure 2:
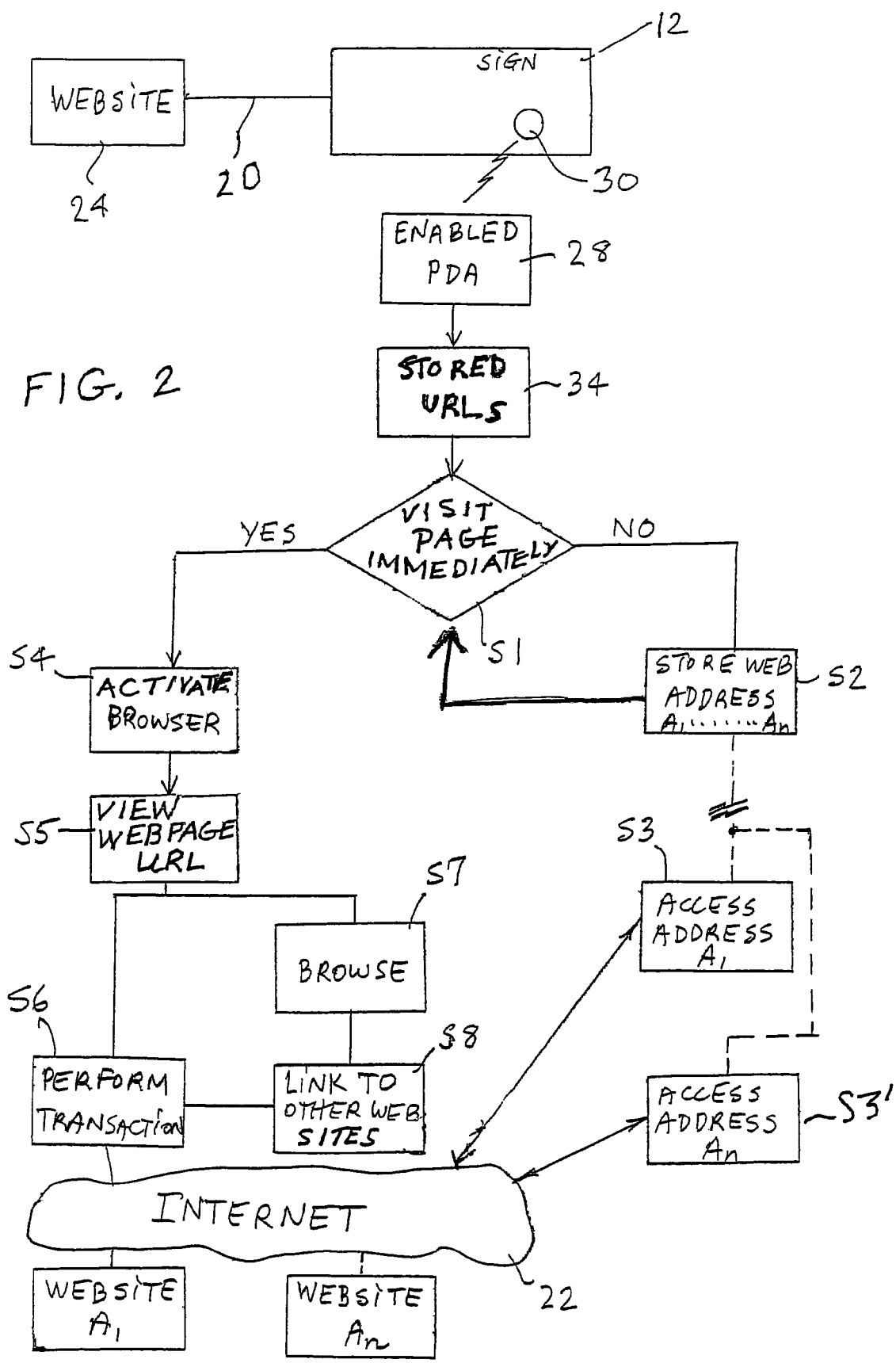
FIG. 2 is a flow chart illustrating the overview and primary features of the system and method in accordance with the information.

As shown in the flowchart of FIG. 2, having temporarily stored a URL in the memory stack 34, the user can now determine, at S1, whether to visit the web page (the URL of which has been transmitted) immediately or at a later time. For example, upon transmission of the URL to the PDA, the user may press a "run now" button to activate the browser and immediately view the web page of the selected URL. Alternatively, the user may press a "store" button to store the "hit" for later access at the user's convenience.

If the user has no interest in immediately accessing the web page, the URL may be permanently stored in a memory stack 34, at S2. As many URLs can be stored as the size of the memory stack 34 or the listing of phone numbers captured in memory subset 36 will allow, and each memory stack location, as stated above, may include a descriptive phrase or descriptor of the company, product, or service, or another reason why the user decided to download or receive a given URL. At a later time, at S3 through S3', the user can access any one of the web pages of the stored URLs, at which time web sites ($A1 \ldots A_n$) can be accessed previewed, reviewed, downloaded, printed, activated, transferred, etc., at the convenience of the user. At such time, at S6, if the web site allows or permits purchases to be made over the web site, such can likewise be performed.

If the user decides to visit the web page immediately after the URL is initially downloaded and stored, the user's device 28 (e.g., PDA, cell phone, lap-top computer, or any other suitable hand-hand transceiver) can enable or activate a browser (whether the browser resides on the PDA, cell phone or home PC), at S4, and the page represented by the URL can be viewed, at S5. At such time the user can also perform a transaction, at S6, such as making a purchase of a product or service. Alternatively, once the user is at a specified web page represented by the transmitted URL, the user may choose to further browse or explore the web site, at S7, to obtain additional information or compare the product or service advertised with other products or services of the same advertiser or those of other providers or companies. The user may also link to other web sites at S8. Once the user has obtained all of the information needed to make a determination and a decision regarding the purchase, the user may perform a transaction through a web page at S6, accessed, while browsing. Again the transaction can be performed, as before, at S6, on a web site via the Internet 22.

An advantage of the present invention is that the URL is received by device 28 only when the user of device 28 initiates communication with transmitter 30. In other words, the URL is selectively received by an interested user, instead of merely being broadcast (i.e., spammed) to any nearby transceiver.

Figure 3:
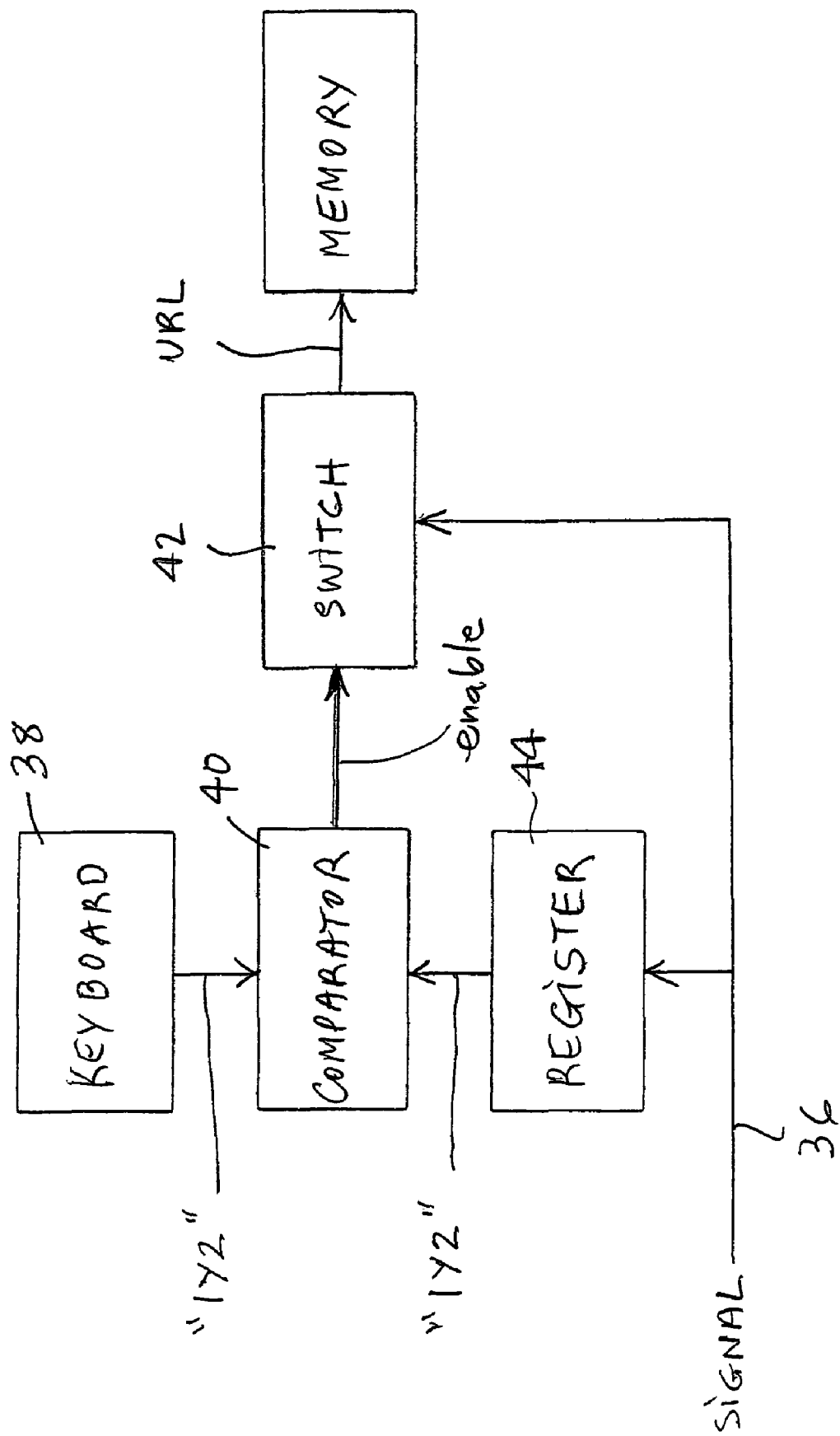
FIG. 3 is a block diagram of a circuit within the receiving device for filtering the incoming transmissions in order to contact information of interest while blocking the remaining information that may simultaneously be broadcast to the receiving device.

FIG. 3 is a block diagram representing a preferred system that may be used to filter out undesired URLs. Where the portable device 28 is highly directed, and can communicate directly with the transmitter 30 by means of a highly directional form of communications (e.g., infrared (IR) or another means for optical communication), there may be no need for filtering inasmuch as the desired URL can be obtained by pointing or directing the device 28 toward the transmitter 30 of the target or sign 12. Filtering may likewise not be necessary when there is only one isolated transmitter 30 within a given region covered by the radiation, given the generally limited range of some of these low powered transmitters. For example, Bluetooth® technology generally contemplates radiation over a distance of approximately 10 m, so that if there exists only a single transmitter within that range, only a single URL will be received. Enabling the device within such a region will, therefore, result in the accurate reception of a single URL.

In a congested area, however, with numerous advertisers and numerous transmitters 30, some filtering may be necessary. While there may be numerous approaches in filtering such information, FIG. 3 illustrates one filtering approach. The sign 12 contains a code 1Y2, which is referred to in FIG. 1 as reference numeral 12'. Code 1Y2 can be entered manually by the user into device 28. Alternatively, if device 28 is provided with optics that are sufficiently accurate, the user may be able to point the PDA at the code 12' and an image of the optical image of the code can be received within the PDA. Use of optical character recognition ("OCR") may then be used to convert the image of code 12' into computer-recognizable alphanumeric characters. Either way, the PDA now has the identity of the specific target, sign, or advertisement 12, in which the user has shown an interest.

In FIG. 3, the line 36 represents the signal line received from the R-F receiver. The signal line 36 consists of one or a plurality of URLs. In accordance with the present invention, the URLs are preferably transmitted together with the code 1Y2 associated therewith. Thus, the signal transmitted for the URL "www.uspto.gov" becomes a coded URL "www.uspto.gov.1Y2", the last segment of the coded URL being code 1Y2 corresponding to the code 12'. The coded URL on signal line 36 is directed both to a switch 42 as well as to a register 44. The register delineates the code 1Y2 of the coded URL and transmits the code 1Y2 to the comparator 40. When the codes inputted to the comparator 40 from keyboard 38 and register 44 are identical, the URL is permitted to be transmitted through the switch 42. Only the desired URL, therefore, can be inputted to the memory of device 28. All other memories are effectively blocked by the switch 42. It should be clear that the proposed method of filtering provides only one illustrative approach, and numerous other ways of ensuring that only the desired URLs are accepted and stored in the device 28.

The concept of "air-mouse" technology is another preferred filtering method for extracting information from an icon by use of radio waves, and is another low cost method of achieving the goal of the present invention. When someone points an air-mouse at an active link icon or at an open document icon representing a document that has been minimized on a regular computer screen, the information contained in that icon pops up. The length of the URL makes no difference. This is exactly what happens when one uses a regular mouse with the exception of the method of extracting the information. One uses Digital Radio Technology whereby the device (i.e., the air-mouse) targets the icon with radio waves, which invokes the information contained within the icon and waits for the user to, in effect, choose (by clicking) to enter that item. A traditional mouse simply invokes the information contained in the icon when the cursor is placed on top of the icon because of the interplay between the object on the screen and the mouse software contained on the hard drive of the computer. Again, the system then waits until the user makes a click on the mouse in order to enter the target that was displayed on that icon. When the cursor, whether it be by air-mouse or regular mouse, is placed over the target the entire URL is usually displayed. The air-mouse works very well within short distances (e.g., about 6 feet). Thus, no matter what part of a site is targeted whether it is the home page of a site or a page deep within the site, the customer will know the advertiser they chose because of the initial part of the URL address is the same. Just by capturing the site the user will always know what the site pertained to because they read the path contained in the downloaded address. So, for example, we would easily be able to see that the interest in a pair of slacks could cause the conscious decision to target a particular advertisement for the pair of slacks. It is also important to point out that the cell phone or PDA display preferably allows for at least a 50 character display, so that URL locations deep within a site can be fully viewed with this approach. The problems with Radio traffic may not be a problem with this approach. Most people will be quite close to the object that they have made the choice to target. They will be pointing the PDA or Cell Phone directly at the target, and the air-mouse technology will not be disturbed by any object that gets directly in its way. It will go right through due to the properties of radio waves. Upon pointing at the target just as when using a mouse, the URL contained within that target will automatically be displayed on the screen display of the PDA or Cell Phone.

The present invention may be adapted to access URL information right off of an icon on a TV set, such as those icons that appear on music channels on cable where the album cover of the current song playing is displayed. Conceivably, any advertiser that shows an icon during their commercial could lead a consumer who chooses to capture the URL in that icon right to the item that was just shown on TV. Many cable companies have pure music channels that run on a 24-hour basis. One song after another comes up, wherein they tell you about the artist and show you the album jacket. The present invention facilitates the purchase of an album based on the desire to own the particular song being played at the moment. Using a transceiver, such as a remote control, air-mouse, PDA, or cell phone, the user would be able to point the transceiver at an icon displayed on the TV screen, and the embedded URL information would be transferred into the transceiver. Subsequently, the user can choose to follow the URL directly to a website offering the album for sale. Thus, the user could immediately purchase the album. Alternatively, the user may store the URL for later viewing or send it to a predetermined e-mail address for viewing on your regular PC. Again, user information in an "e-wallet" contained in the transceiver could take care of a lot of the generic information such as address and credit line. If the user was using a wireless transceiver, then the cable company could devise an easy billing system that takes advantage of the fact that they would already have most of your vital information because you are already a customer and allowing you to either 1) give them a credit line to hold on file for this use or 2) simply include it on your next bill just as they already do when you order a movie from the cable company. Either way being able to take advantage of the music channel in this regard would open the door to almost any product being able to be purchased in this manner. Again, beside electronic targets, the present invention may utilize outdoors and enabled cardboard traditional advertisements such as bus ads, etc.

Figure 4:
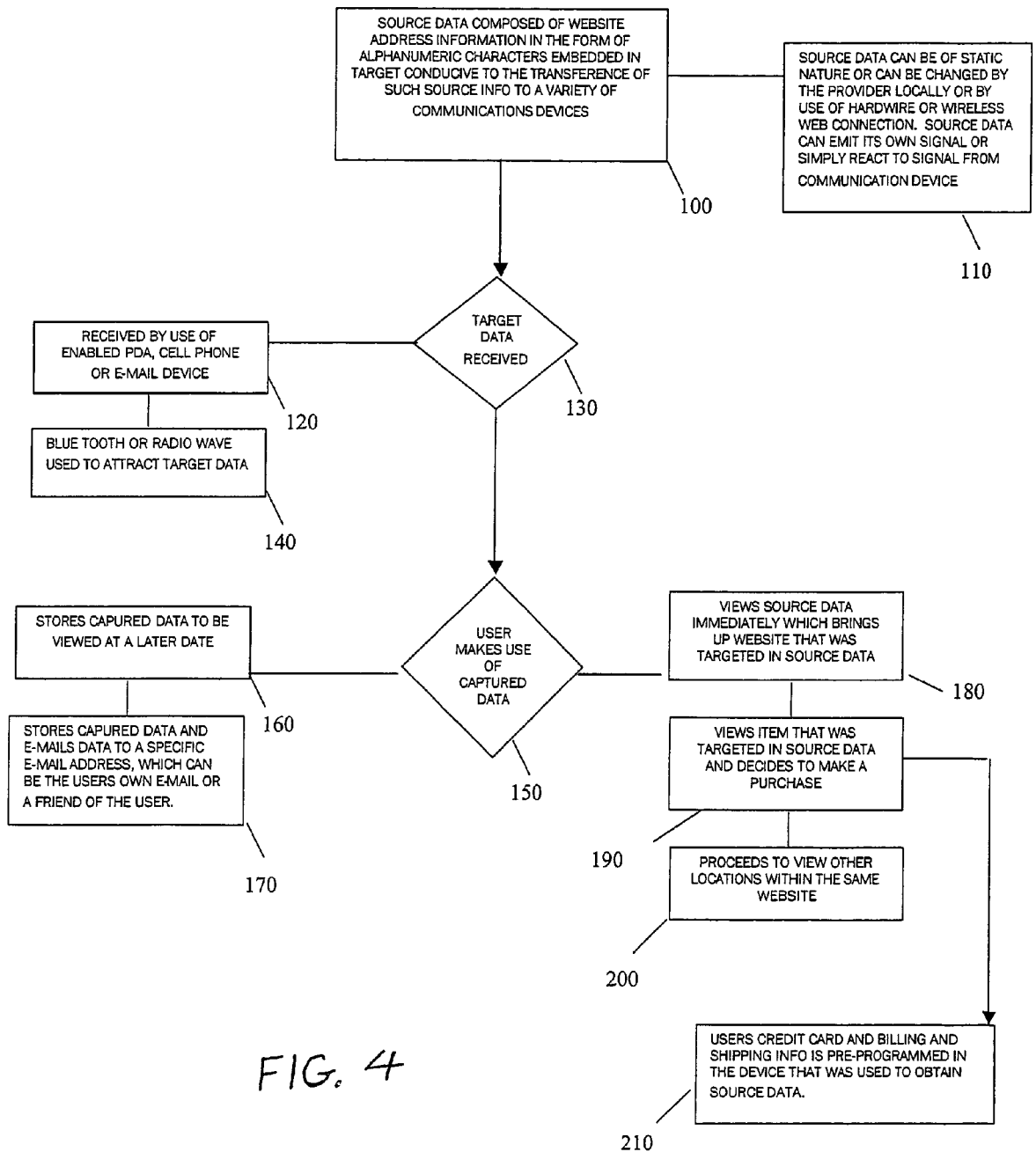
FIG. 4 is a flow chart illustrating methods of managing the source data by an advertiser.

Referring to FIG. 4, an overview of the invention is illustrated. Steps 100-210 have generally been discussed in connection with the previous FIGS. 1-3. In steps 100-140, source data is embedded in a target that is conducive to enabling the transference of such source data to a variety of communications devices, such as a PDA, cell phone or e-mail device, by use, for example, of radio waves or Bluetooth® technology. The target can be of a static nature or can emit its own signal to assist the communication device in the capturing of such source data. In steps 150-210, data has been obtained by the user's PDA, cell phone, or e-mail service by means of the electronic transference of data via radio waves or wireless technology. Preferably, non-electronic displays, such as bus-ads and clothing objects, are fitted with active radio tags since they are inexpensive and further assist the hand-held device in accessing the embedded information.

A user in possession of such source data makes the following decisions concerning its use: storing the source data for later viewing, e-mailing the source data to a specified e-mail address, and/or the immediate use of the source data in the form of viewing the specific location (i.e., URL) in the web site that was represented in the source data, which may result in the purchase of an item in response to the initial interest in the target or source data, and/or further exploration of the same website, which is still dependent on the original target or source data that initially brought the user into the web site. A user's vital information, including credit, billing, and shipping information, which may reside in the communication device that was used to obtain the source data, assists in making any subsequent purchase that much more convenient. Moreover, sending a URL to a pre-determined e-mail for later viewing on one's home PC is a primary advantage of the present invention.

It would be convenient but is not essential that the user be able to point his or her cell phone or PDA at their home computer in order to be able to make use of the information stored in the cell phone or PDA. Some people are going to want to view the downloaded URLs on the display of their cell phone or PDA and some are going to want to view the "hits" on their home computer. Using air-mouse technology enables the captured URL information to also be viewed on one's home computer. The capability to view the captured URL information on the hand-held device or home computer is important. None of the prior art teaches or suggests such capability. The hand-held device can be programmed to activate the browser on a home PC. If the browser is open, the captured URL would simply be introduced into the URL area of the browser whereby the site address would appear and the browser of the user's home PC would take the user to the page of the website that the advertiser (e.g., the merchant). If the hand-held device could not be programmed to insert the stored URL information directly into the URL area of the browser the following approach could be taken. On the user's desk top of their home PC there could be an icon that has a sole function of being a "receiver" (essentially an icon with no contents) that "awaits" the stored URL that the user would like to view. The user can then choose one of the captured URLs that they have stored on their cell phone or PDA display. Pointing to and clicking on the "awaiting icon" that resides on the home PC causes the "awaiting icon" to absorb the URL information from the hand-held device whereby it now becomes an active link and immediately launches the browser which goes to the targeted location. When used again the new URL would simply override the previous information stored in the "awaiting icon" and the new selected hit would now load. The locations that were viewed in the browser of the home PC stemming from the user's PDA or cell phone would then be stored in the browser history of the PC as is the case of normal home use of a Personal Computer.

In another embodiment, if using a cell phone, it is also quite possible that a phone number could be embedded in a target or advertisement, which, when captured as is illustrated in the phone number listings 36 captured with the URL, would auto-dial a company for a user to get information or order from a company without a website or a company that has only a particular product that they are attempting to sell or intentionally targeting that one product in a certain locality. This would enable the user to take advantage of the advertisement on the spot. Invoking the auto-dial feature would result in displaying all of the user's credit and address information, which may be contained within the user's cell phone or PDA, to the operator for the sale to go that much smoother and that much quicker and to allow that company to data mine the prospective customer.

There is no downside to this since the user does not need to write down or remember any number in order to make use of this as is the case with other telephone number advertisements.

Figure 7:
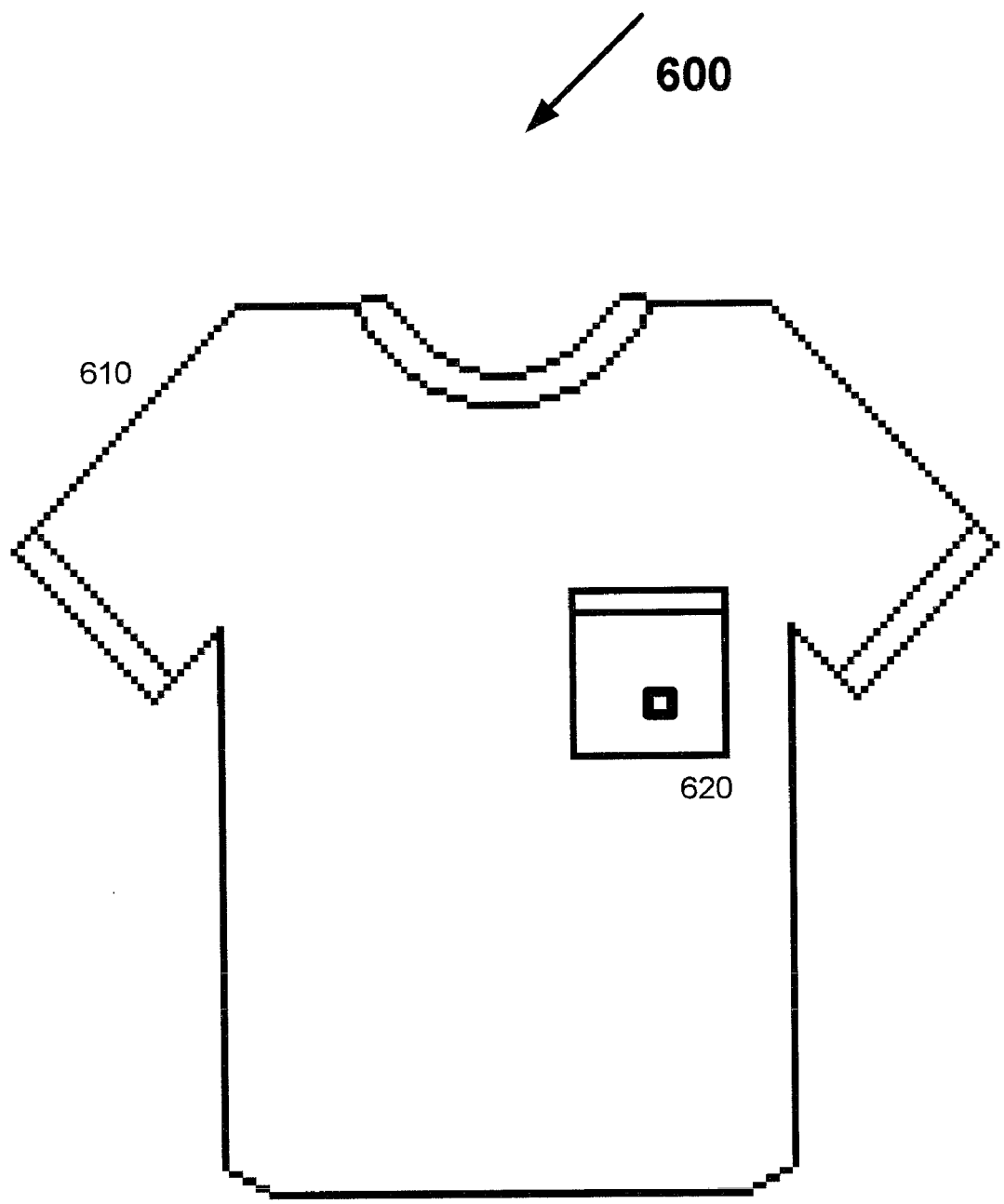
FIG. 7 is a diagram of an exemplary piece of clothing with an embedded tag for transmitting data to a receiver or transceiver.

The present invention can be used in clothing, as is illustrated in FIG. 7, so that a person can act as a "Human Icon™". FIG. 7 shows a system 600 comprising a T-shirt 610 with a transmitter tag 620 embedded in the shirt pocket. It is contemplated that the tag can be attached to the article of clothing in any practical manner, whether embedded in the lining, attached to a portion of the shirt, or incorporated into the decorative design, if any. Whether it is a vest, a cap, a jacket, etc., there are many people who stand on corners and in convention centers and corporate events and give out information and push products. A person may use the present invention to skip paper handouts and obtain the URL for later viewing.

Figure 6A:
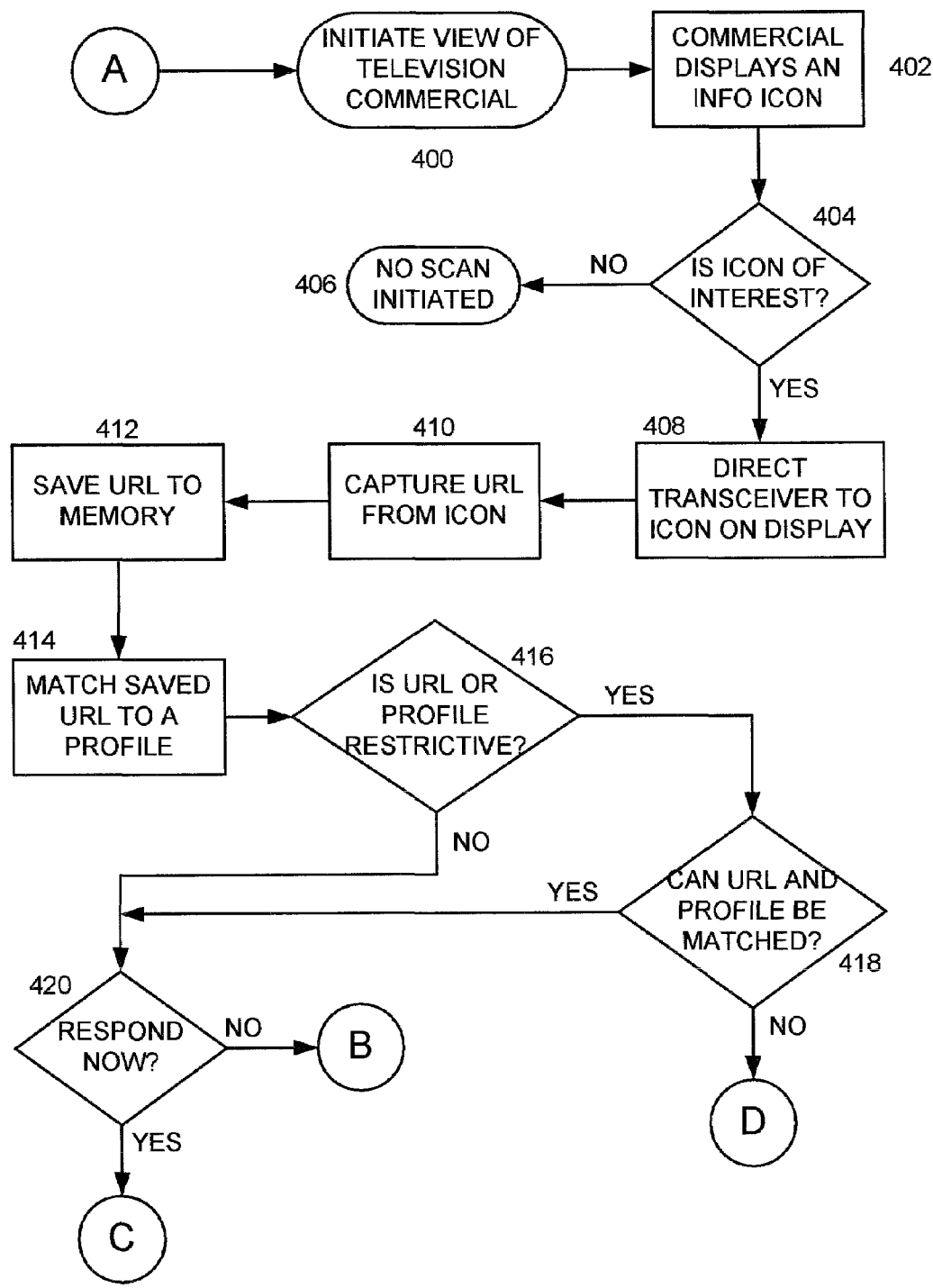
FIG. 6A is a flow chart of the method for making a scan of an icon from a television commercial and distributing data relative to the scan.
Figure 6B:
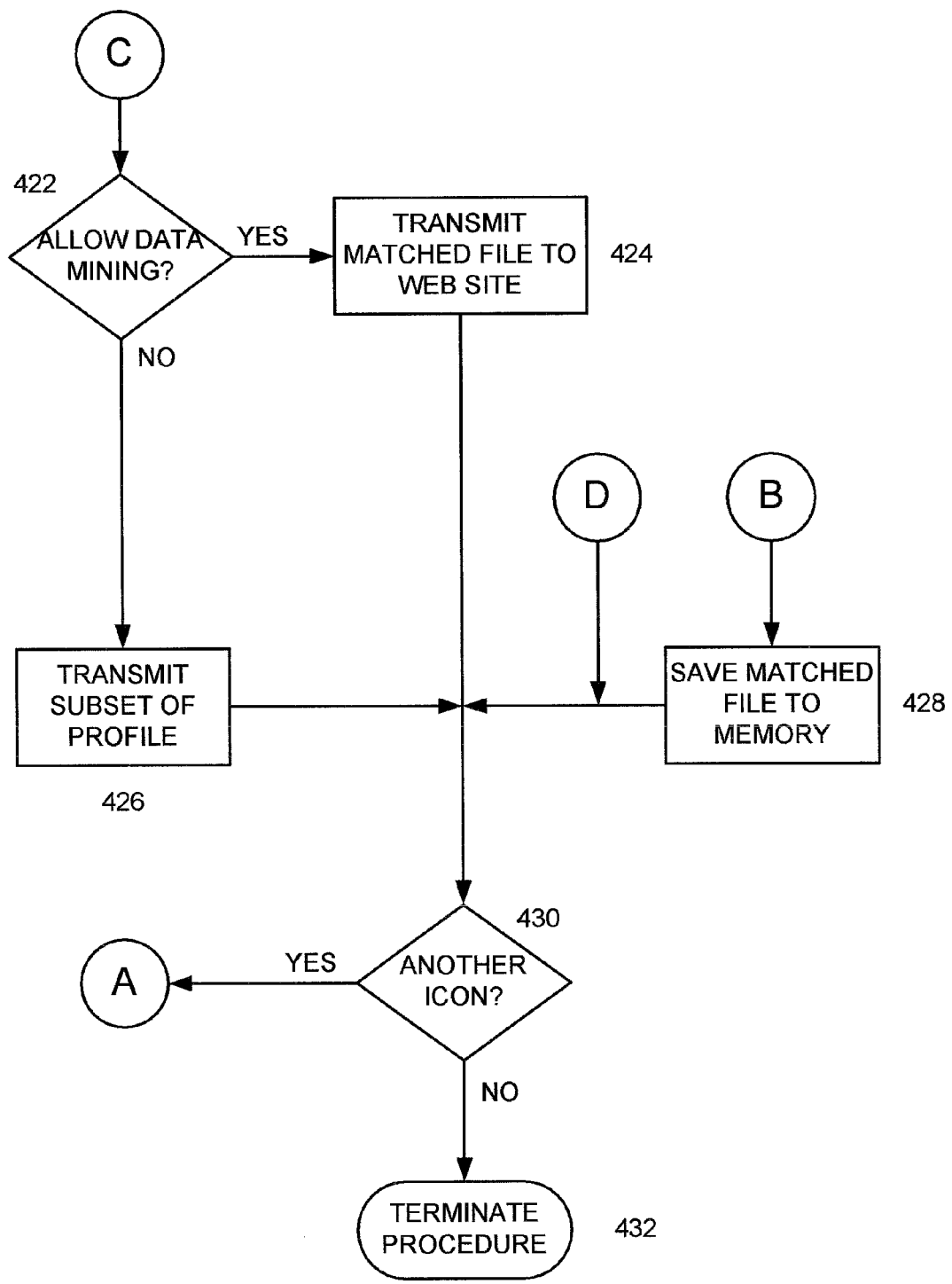
FIG. 6B is a continuation of the flow chart of FIG. 6A showing a flow chart of the method for making a scan of an icon from a television commercial and distributing data relative to the scan.

Data mining as is shown in step 422 of FIG. 6B is a very important and valuable consideration of people in advertising. How many hundreds of people pass an advertisement where they have an interest and don't write it down or forget it by the time they get to the end of the block? If many people receive source data from a target in a high traffic area, the company may data mine the information from those people, who can now be placed on a mailing list or e-mail list and thus targeted with items that may interest them. A company may identify highly interested potential customers, which the company would have never known about otherwise. A significant amount of advertising money could be saved. Most of the time, a company only knows about potential customers because they previously bought something from the company. For those individuals who want to target the advertisements but do not wish to be data mined they could hit a "no share" button that would allow them to target the sign or poster but their personal information would be blocked from the attempt to data mine.

As indicated, the goal of the present invention system is to be able to extract a website address from a multitude of modes of outdoor advertising, including clothing that allows the wearer to act as a "Human Icon™". For example, convention centers, which typically include hundreds of booths, would now have an additional method of transferring corporate website address info to the people and/or other corporate attendees of the convention. Once the URL is captured, the user is given instant access to the website location targeted in the URL that was embedded in or emanated from the target. The user could also store the captured URL to be viewed at a later time at the convenience of the user. This needs to be done in the most efficient, cost-effective, and least complicated way requiring as little action as possible on the part of the user.

The present invention provides systems and methods for receiving and exchanging information based on a user's proximate presence. In one embodiment, the method of the present invention requires locating a transmitter in an area frequented by persons potentially desirous of information related to the locale. The transmitter broadcasts a universal resource locator (URL), which is received by a user device carried by such persons desirous of the locale related information. The user device then initiates an inquiry based on the URL, to an information database. The information database receives the URL from the portable user device and sends information related to the locale back to the user device. The user views the information from the database using the portable digital device.

The use of an identifying logo by the present invention will alert the user of the system that a particular entity or sign or other mode of advertisement is enabled. Knowing this the user can obtain the URL or other information embedded in the sign, storefront, or bus ad, etc. With this invention a transmitter and a lot of the high tech used to complete the goal of the simple transfer of URL information might not be necessary.

When dealing with icons on a computer screen or glass plasma display, the reader contained in the cell phone or PDA interacts with icons in the same way as when the cursor is positioned on one of the icons on the desktop of a personal computer (e.g., the "e" or Internet Explorer icon) and when left there for a second, the words "Launch Internet Explorer Brower" appear. If you leave the cursor in that position, those words will stay there for at least 30 seconds. Similarly, when a cursor is positioned at any icon on any website that has links the information related to the particular link will appear. It is not believed that there is any need for Bluetooth® or any other high end technology to generate those words (Launch Internet Explorer Brower) and make them appear, nor is it believed that there is a need for that information to emanate from that icon for the information contained within to be invoked. But, of course, if the icon does emit a signal it will only go to help the hand-held receiver in obtaining the embedded information. The similar technology can be used to provide a short descriptor of the URL to facilitate the user's identification of the URL and the product or service that it represents.

Air-mouse technology contained in a Cell Phone or PDA can also provide the ability to have the user point at an enabled advertisement (advertisement would act like screen of PC) and display the information embedded within, whereby: a user points device 28 at advertisement target 12. Pointing at target (advertisement) 12 causes the display on a user's device to reveal embedded information in the advertisement just as when pointed at the icon on a computer. By the user looking at the URL in the cell phone or PDA display and confirming that they want that link they press a "YES" button which automatically activates their browser and brings up the URL that the advertiser intended for the user to view. If they do not want to activate the browser they can simply hit the "store" button and view it when they want or go to their home PC and point the stored URL at their computer since they are using air-mouse technology. This can bring up the site on their home PC screen if they do not wish to view it on their "cell phone or PDA screen" because they are more comfortable with the screen size. Viewing on a Cell Phone or PC can be a seamless process. Although the displays on the Cell Phones and PDA's will continue to get better many people will still want to view captured sites on their home PC. The farther the range the more hitting the wrong target becomes an issue.

In another embodiment, if using a cell phone it is also quite possible that a phone number could be embedded in an enabled advertisement which when captured can auto dial a company for a user to get information or order a particular product that was being advertised. This might be because the user in this case has a phone that does not have a display or does not have an adequate display so a phone call in this case would still enable the user to take advantage of the ad on the spot. Invoking the auto dial would result in displaying all of the user's credit line and address information that was contained within their cell phone or PDA to the operator for the sale to go that much smoother and that much quicker.

After an individual has captured a URL, in the PDA or cell phone, and once having that captured URL in the display, the user can choose:

(1) to view, immediately, the hit that will automatically activate the browser on the hand-held device;

(2) to view it later on the hand-held device or on a home PC; and/or (3) to have the captured URL e-mailed to a predetermined e-mail address as an active link so that when the user opens the e-mail later on, just by clicking on the active link in the e-mail he or she will be automatically taken to the active location that was captured from the URL target.

In still another embodiment use is made of the different radio frequencies that the air-mouse can accommodate. For instance, under one frequency, information can identify the target as a Male 42 years of age, as well as his/her e-mail address. When passing a retail clothing store for example, the user targets an advertisement that states "today's specials," a URL is received that takes the user to the Men's department and shows a sale on dress shirts. The user also uploads and captures the information including the e-mail address so the user instantly downloads data. Another person who is 25 years old, and the mother of a baby girl may receive a message that contains a URL that sends her to infants and toddlers and shows her baby clothes. On the other frequency, the advertisement would act as more of a generic sign by simply providing a user with the retail clothing-store's home page. It is important to note that, in the situation of using the frequency that identifies the age, etc., of the user, if a particular advertisement has nothing more embedded in it than the URL of that company's home page, then the user simply receives the home page.

The present invention also contemplates a number of additional modifications or applications for use with the same technology. Thus, for example, it is contemplated that a merchant can manage multiple advertisements in the form of signs or display from a central location. In this location, a web site can be implemented that serves these merchants for maintaining the signs or advertisements up-to-date and current. In effect, a merchant that might own multiple stores or a store that features multiple department categories, using electronic displays taking the form of computer monitors or gas plasma displays and the like, such an owner of a department store, would be making use of a central managing web site that would essentially assist the merchant (or main office) in managing multiple and distinct targets that physically reside in multiple store locations, such targets which are set in the "management system" and such target information thus being transferred by use of wireless technology or through the possible use of a hardwire connection from the target to a USB port in the back of a computer. It is also contemplated that a schedule be plotted on a timer that would enable a store owner to set a multitude of direct update changes that would automatically kick in, at predetermined times during the day. In this way, when using the centralized target management system, one might be able to set a specific target to a specific location in a web site between one block of hours (e.g., 9-12), another location within the site or another site within another block of time (e.g., 12-5), and still another from closing hours to the opening of the next day. The table provides a suggested schedule set up with an auto-timer for modifying the advertisements and/or the URLs during the course of a day or during the course of a week.

Where a storeowner is to provide a low cost method of being able to update the targets, when needed, the situation may be slightly different. For instance, the store owner during the day has his or her target set to a coupon page within the site or special page on the web site that features special offers, which customers who pass by can access via portable receiving devices and take advantage of during the day, etc. During the evening hours, when one might want people to be able to go to the web site connected with the store and check out the store as a whole, it might be that the target should be set to the home page of the site. He or she could do so in the following way: The target in this scenario is an independent unit not connected to any web site system. Somewhere on the physical target, which most probably takes the form of a CPU, a jack can be provided and a mini-keyboard can be connected so that the merchant can connect the keyboard and proceed to key in the new target information as needed, which would then appear on the screen whether it be a PC or gas plasma screen in the form of an icon or logo that will be conducive to the transference of URL info embedded therein to the user's hand-held device. Another way for locally managing a target could take the form of a sign utilizing active or passive radio frequency tags such as those used in smart cards where the merchant has a device that allows him or her to rewrite or override the current information residing on the smart card with the new target information. Each time updated information is inputted, the new information can override the old information and the update will take place. Other forms or approaches for programming the advertisements and/or the targeted information or URLs are well within the scope of those skilled in the art, as exemplified by the publications in the "Background of the Invention." See, for example, FIG. 4.

Figure 5:
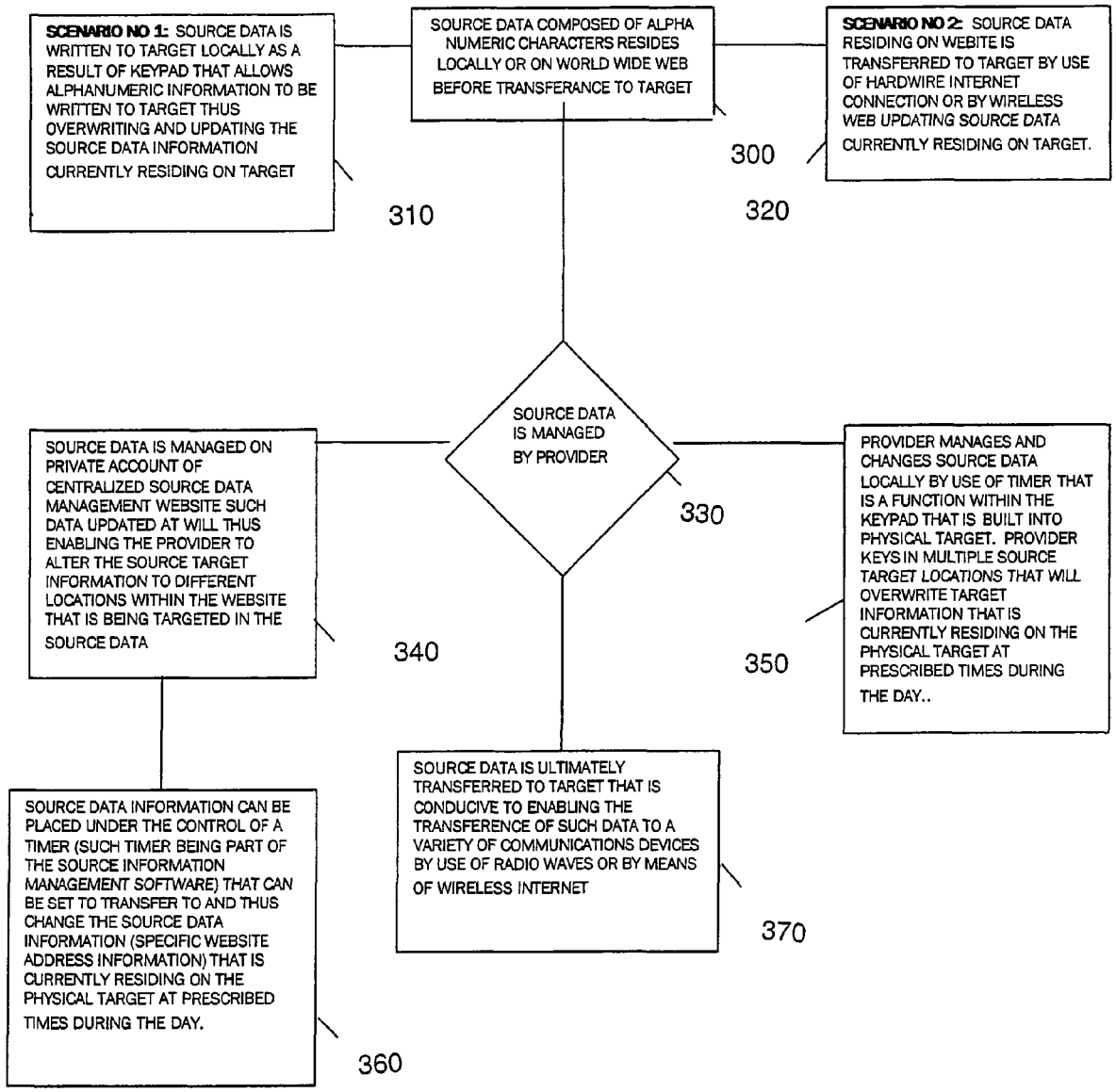
FIG. 5 is a flowchart for managing source data used in connection with the invention.

In FIG. 5, which shows the management of the source data information, at 300-320 the source data is written to target either by local means or by use of hardwire or wireless Internet. At 330-360, the source data can be managed by the provider either locally or by special web site devoted to the management of an individual provider's source target info, allowing the provider to change the source data information (specific web site address info) that is currently residing on the physical target at prescribed times during the day. At 370 source data is ultimately transferred to a local target either locally or by hardwire or wireless Internet that is conducive to enabling the transference of such data to a variety of communications devices by use of radio waves or by means of wireless Internet.

Turning now to FIG. 6A, there is shown a flowchart combining the methods previously discussed into a coherent flow. The method flow begins at step 400 when a television viewing sequence is initiated and an advertisement is presented. The flow advances to step 402 where a particular commercial displays an informational icon within the commercial field. The viewer must determine at step 404 whether or not the advertisement (and thus the icon) is of interest to the viewer. If the response to the query at step 404 is "NO", then the flow advances to step 406 and no scan is initiated. However, if the response to the query at step 404 is "YES", then the flow advances to step 408 where a transceiver is directed toward the icon in the display to capture, at step 410, the URL in the icon. Once captured, the URL is saved to a memory at step 412 and matched, at step 414, against profile data resident in the transceiver. From step 414, the flow advances to a query at step 416.

The query at step 416 asks if there is a restriction placed on either the URL or the Profile stored in the transceiver. A restriction serves the purpose of protecting profile information of the transceiver user and allowing only certain information to be transmitted when a URL is catured. In turn, an advertiser can target customers by restricting transmission of its URL to only those who fit a particular profile. If the response to the query at step 416 is "YES", then the flow advances to a query at step 418 which asks if the URL and the profile can be matched in whole or in part. If the response to the query at step 418 is "YES", then the flow re-enters the stream in front of step 420. If, however, the response to the query at step 418 is "NO", then the flow advances over path D to re-enter the flow in after step 428 as is shown in FIG. 6B. Returning now to the query at step 416, if the response to the query is "NO," then the flow re-enters the stream in front of step 420.

At step 420, there is a query which asks if the system user wants to respond to the URL now. If the response to the query is "NO," then the flow advances over path B to re-enter the flow at step 428 as is shown in FIG. 6B. However, if the response to the query at step 420 is "YES", then the flow advances over path C to re-enter the flow at step 422 as is shown in FIG. 6B.

Turning to FIG. 6B, there is shown path C re-entering the flow at the query at step 422. At step 422, the system queries as to whether or not the system user will allow data mining by the URL's host. If the response to the query is "YES" then the flow advances to step 424 where the matched file between URL and user profile is transmitted to the website. From step 424, the flow advances to the query at step 430 which asks if there is another icon to be scanned. If the response is "NO", then the procedure is terminated at step 432. If, however, the response to the query at step 430 is "YES", then the flow returns to step 400 of FIG. 6A via path A. Returning now to the query at step 422, if the response was "NO," then the flow transmits, at step 426, a subset of the profile that protects the personal information of the user. The flow then advances to step 430. Additionally, path B re-enters the system flow at step 428 where a matched file is saved to a memory of the transceiver for future use. From step 428 the flow advances to step 430.

Other embodiments or modifications may be suggested to those having the benefit of the teachings therein, and such other embodiments or modifications are intended to be reserved especially as they fall within the scope and spirit of the subjoined claims.

What is claimed is:

1. A system of facilitating the dissemination of information comprising a target, said target further comprising:
   (a) an information display that is visible to a plurality of interested users;
   (b) a memory assembly for storing a URL for a web-site related to the display;
   (c) a transmitter assembly adapted to transmit the URL with a filtering code adapted to be used in a respective hand-held transceiver to avoid receiving interference or incorrect information; and
   (d) an identifier that indicates to the plurality of users that the target comprises the memory assembly and transmitter,
   (e) a comparator; and
   (f) a register adapted to receive and delineate said filtering code and then to subsequently transmit said filtering code to said comparator:
      (i) wherein the identity of a specific target to be read by, and/or interfaced with, said hand-held transceiver is registered by said interested user entering a code into said hand-held transceiver, and wherein said entered code is representative of said specific target;
      (ii) wherein said comparator compares said filtering code received from said register with said entered code entered by an interested user; and, if said codes are identical, then permitting said URL to be transmitted to said hand-held transceiver,
      (iii) whereby a respective interested user upon seeing the display and graphic identifier may use a respective hand-held transceiver to receive the URL transmitted by the target and selectively activate the URL through a browser independent of the target.

2. The system according to claim 1, wherein:
   (a) the information display is an electronic display having a URL embedded therein; and
   (b) an air mouse capable of scanning said URL into a memory of said air mouse and wherein said air mouse is capable of transmitting said URL so as to place the URL into the browser of a user's home computer.

3. The system according to claim 2, wherein the icon appears on a television commercial and the URL is utilized for an instant purchase to be billed according to information stored in the hand-held transceiver.

4. The system according to claim 1, wherein the transmitter is an active transmitter, and whereby the URL is available to the plurality of interested users.

5. The system according to claim 1, wherein the transmitter is a passive transmitter, whereby the respective hand-held transceiver is adapted to provide energy that activates the transmitter.

6. The system according to claim 1, wherein the hand-held transceiver is a cellular phone, personal data assistant, or laptop computer adapted to enable auto-dial of at least one phone number embedded with the URL transmitted by the target.

7. The system according to claim 1, wherein the URL is a specific embedded page of a web site.

8. The system according to claim 1, wherein the URL is received by a respective hand-held transceiver operated by respective interested user only when the respective interested user initiates communication with the transmitter, whereby the URL is selectively received.

9. The system according to claim 1, wherein the URL is targeted to a male or female depending on information in the respective hand-held transceiver.

10. A system of facilitating the dissemination of information comprising:
   (a) a target comprising:
      (i) a display that is visible to a plurality of interested users;
      (ii) a memory assembly for storing a URL of a website related to the display;
      (iii) a transmitter assembly adapted to transmit the URL with a filtering code adapted to be used in a respective hand-held transceiver to avoid receiving interference or incorrect information;
      (iv) an identifier that indicates to the plurality of users that the target comprises the memory assembly and transmitter; and
   (b) a hand-held transceiver;
   (c) a comparator; and
   (d) a register adapted to receive and delineate said filtering code and then to subsequently transmit said filtering code to said comparator:
      (i) wherein the identity of a specific target to be read by, and/or interfaced with, said hand-held transceiver is registered by said interested user entering a code into said hand-held transceiver, and wherein said entered code is representative of said specific target;
      (ii) wherein said comparator compares said filtering code received from said register with said entered code entered by an interested user; and, if said codes are identical, then permitting said URL to be transmitted to said hand-held transceiver, whereby a respective interested user upon seeing the display and graphic identifier may use the hand-held transceiver to receive the URL transmitted by the target.

11. The system according to claim 10, wherein said display is an article of clothing and said article of clothing has said transmitter embedded therein to transmit the URL.

12. The system according to claim 10, wherein the transmitter assembly comprises a radio frequency transmitter or an infrared transmitter.

13. The system according to claim 10, wherein the transmitter is an active radio frequency tag, whereby the URL is available to the plurality of interested users.

14. The system according to claim 10, wherein the transmitter is a passive radio frequency tag, whereby the respective hand-held transceiver is adapted to provide energy that activates the transmitter.

15. The system according to claim 10, wherein the hand-held transceiver is a cellular phone, personal data assistant, or laptop computer.

16. The system according to claim 10, wherein the URL is a specific embedded page of a web site.

17. The system according to claim 10, wherein the URL is received by a respective hand-held transceiver operated by the respective interested user only when the respective interested user initiates communication with the transmitter, whereby the URL is selectively received.

18. The system according to claim 10, wherein the URL may be received, previewed, stored, activated, or transferred by a respective user using a respective hand-held transceiver.

19. A method of facilitating the dissemination of information comprising the steps of:
   (a) providing a target wherein said target comprises:
      (i) a display that is visible to a plurality of interested users;
      (ii) a memory assembly adapted to receive and store a URL related to the display;
      (iii) a transmitter adapted to transmit the URL with a filtering code adapted to be used in a respective hand-held transceiver to avoid receiving interference or incorrect information; wherein the identity of a specific target to be read by, and/or interfaced with, said hand-held transceiver is registered by said interested user entering a code into said hand-held transceiver, and wherein said entered code is representative of said specific target
      (iv) an identifier that indicates to the plurality of users that the target comprises the memory assembly and identifier;
   (b) receiving and storing the URL in the memory assembly;
   (c) transmitting the URL together with said filtering code;
   (d) receiving and delineating said filtering code at a register and then subsequently transmitting said filtering code to a comparator:
   (e) comparing, at said comparator said filtering code received from said register with said entered code entered by an interested user; and, if said codes are identical, then permitting said URL to be transmitted to said hand-held transceiver;
   whereby a respective interested user upon seeing the display and graphic identifier may use a respective hand-held transceiver to receive the URL transmitted by the target.

20. The method according to claim 19, wherein said display is one of a plurality of store displays, and a website hub controls the rotation of URLs to said plurality of store displays by time of day or by store depending on respective locations and time zones.

21. The method according to claim 19, wherein the URL information is on a timer system.

22. The method according to claim 19, wherein the transmitter is an active transmitter, and whereby the URL is available to the plurality of interested users.

23. The method according to claim 19, wherein the transmitter is a passive transmitter, whereby the respective hand-held transceiver is adapted to provide energy that activates the transmitter.

24. The method according to claim 19, wherein the hand-held transceiver is a cellular phone, personal data assistant, or laptop computer.

25. The method according to claim 19, wherein the URL is a specific embedded page of a web site.

26. The method according to claim 19, wherein the URL is received by a respective hand-held transceiver operated by the respective interested user only when the respective interested user initiates communication with the transmitter, whereby the URL is selectively received.

27. The method according to claim 26, further comprising data mining of users who initiate communication with the transmitter.

* * * * *